Jan. 9, 1968

C. R. POLIT ET AL 3,362,426

LOCK VALVE ANTI-THEFT DEVICE

Filed June 11, 1965

INVENTORS.
CHARLES R. POLIT
RAYMOND J. SAVOY
LOUIS J. FALZONE

BY

*Caesar, Rivise,
Bernstein & Cohen*
ATTORNEYS.

United States Patent Office 3,362,426
Patented Jan. 9, 1968

3,362,426
LOCK VALVE ANTI-THEFT DEVICE
Charles R. Polit, 126 Tompkins St., Pittston, Pa. 18640;
Raymond J. Savoy, 159 Oak St., Pittston Township, Pa.
18640; and Louis J. Falzone, 540 Wyoming Ave.,
Wyoming, Pa. 18644
Filed June 11, 1965, Ser. No. 463,300
2 Claims. (Cl. 137—384.2)

ABSTRACT OF THE DISCLOSURE

A lock valve anti-theft device including a valve positioned in a special housing. Special housing includes U-shaped sections of sheet metal which are held together by screws located closely adjacent to a rear surface so as to be inaccessible to unauthorized entry.

---

This invention relates to a lock valve anti-theft device, and more particularly to an improved device of this general class.

It is known that the theft of an automobile can be achieved without the necessity of procuring a key for the ignition lock and even without the necessity of tampering with the ignition lock. The theft of many automobiles is made possible by bringing into contact certain wires associated with the ignition system, and once the automobile motor is started, the thief may drive away with impunity.

In an effort to thwart the efforts of automobile thieves, it has been previously suggested to provide a valve in the fuel line that can be actuated only by a key that will operate a lock associated with the valve. However, previous lock valves have suffered certain shortcomings, and thus the commercialization of these devices has not been realized. Many of the prior devices could be easily tampered with by a car thief, and so do not serve their intended purpose. Other lock valves that were previously suggested were difficult to operate, and also tended to foul after relatively short periods of use.

It is therefore an object of the present invention to provide a lock valve that cannot be easily tampered with, and will not foul even after relatively long periods of use.

Yet another object of the present invention is to provide a lock valve that can be easily and simply operated by the simple turning of a key.

Still another object of the present invention is to provide a lock valve that is preferably associated with the braking system of an automobile rather than the fuel system, although the lock valve of the present invention is applicable to either system. It is desirable that the lock valve of the present invention be associated with the braking system because more reliable action has been obtained thereby.

Other objects and many of the attendant advantages of the present invention are achieved by providing a lock valve which includes a valve stem that extends away from the valve body and terminates in a forked valve actuator comprised of two relatively widely separated fingers. When the lock is operated with the tumbler thereof rotated through a predetermined arc by an inserted key, an H-shaped connector member secured to the lock tumbler turns the fingers of the valve actuator which are held captive by the connector member. In this way, the turning of the key in the lock causes rotation of the H-shaped connector member that carries along with it the valve actuator thereby also rotating the valve stem to open or close the valve. The wide spacing of the two fingers of the valve actuator acts as a lever or force multiplier, and thus a force as slight as the ordinary force associated with turning a key will operate the valve of the present invention even where the valve would otherwise foul.

The lock valve of the present invention is located in a special housing that is difficult to tamper with. The housing comprises a first U-shaped section of sheet metal having a plate welded to the front wall thereof with the lock including the tumbler means extending through the plate and through the front wall. The lock preferably includes external threads so that the lock can actually be threaded through openings in a plate and the front wall of said section and then held in place by a nut secured from within the housing upon the external threads. The two open sides of the first U-shaped section are closed by a second U-shaped section which is secured to the rear of the first U-shaped member by screws which are inaccessible after the lock valve of the present invention has been installed.

Other objects and many of the attendant advantages of the present invention will become more readily appreciated as the invention is described in greater detail by reference to the appended drawings wherein.

Figure 1:
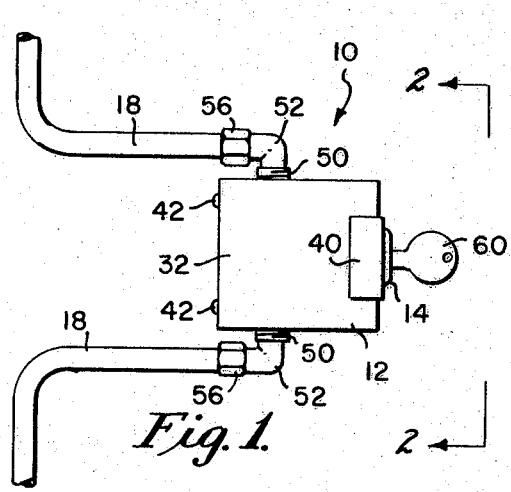
FIG. 1 is a side elevational view of the lock valve of the present invention fully assembled into sections of tubing that form a portion of the braking system.
Figure 3:
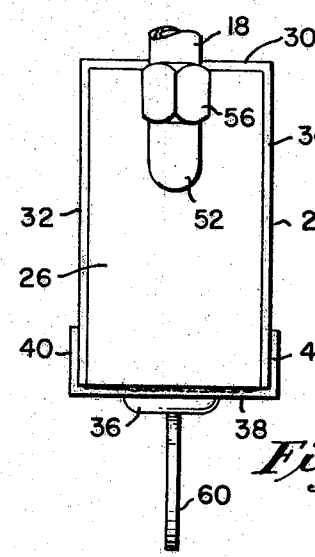
FIG. 3 is a somewhat enlarged top plan view of the lock valve of the present invention.
Figure 4:
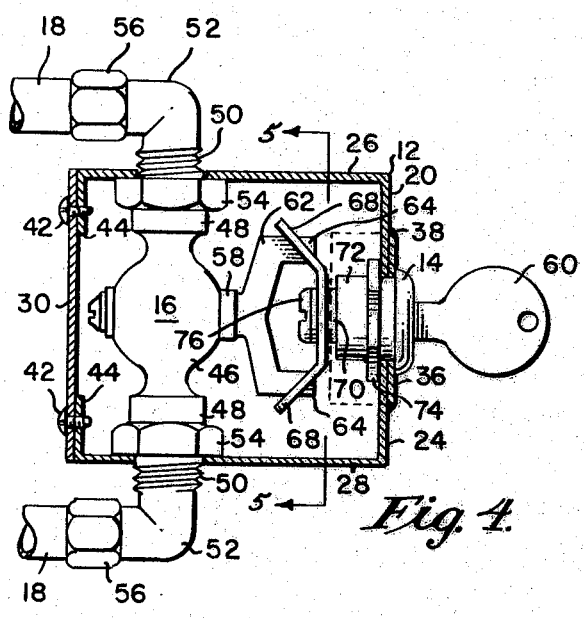
FIG. 4 is a sectional view taken along the lines 4—4 of FIG. 2.
Figure 2:
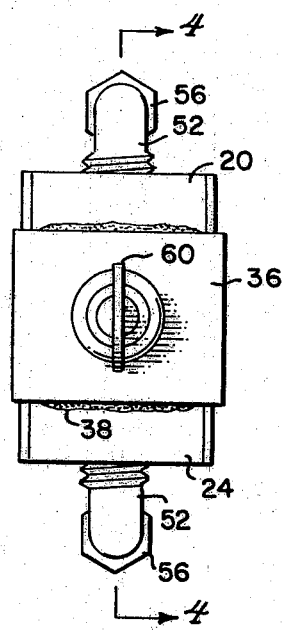
FIG. 2 is a somewhat enlarged front elevational view of the lock valve of the present invention taken along the lines 2—2 of FIG. 1.

Referring now in greater detail to the various figures of the drawing wherein like reference characters refer to like parts, there is shown at 10 in FIG. 1 a lock valve anti-theft device embodying the present invention. The device 10, as shown in greater detail in FIG. 4, basically comprises a housing 12 having a lock 14 secured thereto with the housing 12 containing valve 16 that is secured in brake system tubing 18. As shown in FIG. 4, the housing 12 is comprised of a first U-shaped section 20 and a second U-shaped section 22 (FIG. 3). The U-shaped section 20 includes front wall 24 from which extends top wall 26 and bottom wall 28. The second U-shaped section 22 includes a back wall 30 from which extend side walls 32 and 34. The front wall 24 has a reinforcing plate 36 welded thereto as indicated at 38. The plate 38 includes vertical side wings 40 which facilitate the assembly of the housing 12 as will be described hereinafter. Both front wall 20 and plate 36 have openings which coincide with each other in order to permit the passage of the lock 14 as will be described hereinafter.

The housing 12 is assembled about valve 16 before the valve 16 is to be installed in brake system piping 18 as will be described hereinafter. The side walls 32 and 34 of second U-shaped section 20 are slid against the interior surfaces of the side wings 40 as shown in FIG. 3. When this is done, the open sides and open back of the first U-shaped section 20 are closed in by the back and side walls of the second U-shaped section 22. After this has been done, screws 42 (FIG. 4) are inserted in complementary openings in back wall 30 and extensions 44 of top and bottom walls 26 and 28. Following this, the compression fittings on the L-shaped legs of piping extensions screwed into the valve body 46 can be tightened on the free ends of the brake system tubing 18 through compression fittings and then fluid permitted to circulate in the brake system.

Should any unauthorized person attempt to reach the screws 42 in order to disassemble the housing 12, it will be found that access cannot be readily obtained to the screws 42 by ordinary tools since the housing 12 should be positioned closely to some rearwardly located surface so there would not be sufficient room behind the head of the screws 42 in which to place even a very short screw driver or even an L-shaped tool. Instead, access to the interior of the housing 12 can be obtained only by shutting off the fluid flow in the brake system and then unscrewing the compression fittings that secure the valve 16 to the brake system tubing. Thereafter, the housing 12 is lifted away still containing valve 16. Only, at this time are screws 42 accessible.

As shown in FIG. 4, the valve 16 comprises a valve body 46 having internally threaded end sections 48 that receive the external threads 50 of L-shaped extension tubing 52 which pass through appropriate openings in housing 12. The end sections 48 terminate in hexagonal surfaces 54 so that when the L-shaped extensions 52 are tightly secured within the valve sections 48, the hexagonal surfaces will abut against the interior surfaces of walls 26 and 28.

The opposite ends of the L-shaped extensions 52 are also externally threaded in order to receive the telescoping nut 56 of a compression fitting arrangement that includes a stop member (not shown) that is secured upon the tubing 18. The free ends of the tubing 18 are then outwardly flared in order to capture the stop members upon tightening of the nuts 56.

The valve 16 further includes a valve stem 58 that extends beyond the valve body and is turnable with the turning of key 60 in the lock 14. Secured to the valve stem 58 is a forked valve actuator 62 that includes two widely spaced fingers 64 that are held captive between the legs 66 of an H-shaped connector member 68. The connector member 68 is secured to the lock 14 in such a manner that the connector member 68 turns with the turning of key 60.

The lock 14 includes a tumbler 70 that is held within an externally threaded casing 72 which is secured against the interior surface of the front wall 20 by nut 74. The tumbler 70 extends backwardly for a sufficient distance that the H-shaped connector member 68 can be secured to the tumbler 70 by means of bolt 76.

Figure 5:
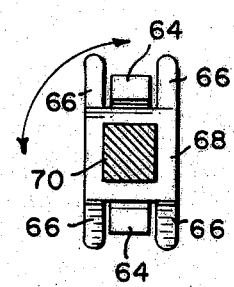
FIG. 5 is a somewhat enlarged fragmentary sectional view taken along the lines 5—5 of FIG. 4 showing the two fingers of the valve stem actuator held captive in the H-shaped connector member of the lock tumbler.

It is to be noted that the fingers 64 of the valve actuator 62 are spaced relatively wide apart and are held captive between a pair of the connector legs 66 in a manner as shown in FIG. 5. In this way, the considerable leverage is exerted when the key 60 is inserted in the tumbler 70 and then turned, because of the relatively large distance between the center line passing through the tumbler 70 and the point of engagement of a finger 64 between two of the legs 66 (FIG. 5). It is thus seen, that the usual force necessary to turn a key is all that is needed in order to rotate the fingers 64 of valve actuator 62. This not only makes for convenience and ease of use, but overcomes any fouling tendency that might be present in the valve.

It is possible to use ordinary valves in connection with the present invention, such as gate valves or plug valves or other shut off valves of known construction.

In order to install the lock valve anti-theft device of the present invention, the housing 12 is first fitted about the valve 16 with the fingers 64 of the valve actuator 62 being placed in captive relationship to the legs 66 of the connector member 68 which extend from tumbler 70. The second U-shaped section 22 is then assembled upon the first U-shaped section 20, and the screws 42 inserted and tightened. The L-shaped tubing extensions 52 are then joined to the brake system piping 18 by compression fittings including telescoping nuts 56 which are tightened in order to achieve a satisfactory seal. The back wall 30 of the housing 12 should be positioned in such a manner that it is spaced closely adjacent some rearwardly located surface so that access thereto is extremely difficult.

While it is preferred that the lock valve of the present invention be secured within the brake fluid system, it is contemplated that the lock valve of the device of the present invention may also be secured in the fuel system in the event it is not convenient to make an attachment to the brake fluid system. Where desired, the tumbler 70 can be constructed to receive the ignition key thereby avoiding the necessity of requiring two keys in order to start the automobile.

Should an unauthorized person bring the ignition wires together and thereby start the motor of the automobile, the lock valve of the present invention will prevent theft of the automobile since without fluid flow in a brake system, it will not be possible to move the automobile since the brake shoes will tightly grip the brake drum until such time as there is brake fluid flow.

It is thus seen that the lock valve device of the present invention can be easily installed and will present a substantial impediment to the theft of the automobile.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A lock valve anti-theft device comprising a valve adapted to be secured in a vital fluid system of an automobile and a lock with a tumbler associated with said valve in order to permit the opening of said valve only by authorized persons, said lock valve anti-theft device further comprising a valve body spaced from said tumbler, a key insertable in said lock to turn said tumbler back and forth between a locked and unlocked position, said valve being positioned within a special housing comprising a first U-shaped section of sheet metal and a second U-shaped section of sheet metal, said first section including a front wall and top and bottom walls, said front wall having an opening formed therein, a plate welded to said front wall, said plate also having an opening formed therein which coincides with the opening in said front wall, said tumbler extending in said openings and having external threads, a nut secured on said threads to position said tumbler against said front wall and plate, said second U-shaped section having side walls and a rear wall to complete enclosure of said valve, the top and bottom walls of said first section having rearward extensions with the rear wall of said second section being positioned against said extensions, complementary holes in said extensions and rear wall and screws secured in said holes to hold said special housing together, said rear wall being located closely adjacent to a rear surface whereby said screws are inaccessible to unauthorized entry.

2. The invention of claim 1 wherein said valve includes a valve stem extending away from said valve body and toward said tumbler, said valve stem terminating in a forked valve actuator comprising relatively widely spaced fingers extending away from said valve, a connector member secured to said tumbler and having legs extending for a considerable distance to hold said fingers captive whereby when the lock is operated by insertion and turning of said key in said tumbler, said connector member turns the fingers of said valve actuator thereby moving said valve stem to either a closed or open position, the interaction of said connector legs upon the widely spaced fingers of said valve actuator exerting considerable leverage to overcome any fouling of the valve.

References Cited

UNITED STATES PATENTS

| | | | |
|---|---|---|---|
| 1,107,800 | 8/1914 | Joynes | 137—384.8 |
| 1,236,363 | 8/1917 | Riley | 137—384.2 |
| 1,906,669 | 5/1933 | Thomas. | |
| 2,731,167 | 1/1956 | Moore. | |
| 2,881,789 | 4/1959 | Finazzo | 137—354 |
| 3,174,502 | 3/1965 | Howarth et al. | 137—351 |
| 1,179,628 | 4/1916 | Hines | 137—384.2 |

HENRY T. KLINKSIEK, *Primary Examiner.*

M. CARY NELSON, *Examiner.*